United States Patent
Sawada

(10) Patent No.: US 10,421,190 B2
(45) Date of Patent: Sep. 24, 2019

(54) ROBOT DEVICE, METHOD OF CONTROLLING ROBOT DEVICE, COMPUTER PROGRAM, AND PROGRAM STORAGE MEDIUM

(71) Applicant: Sony Corporation, Tokyo (JP)

(72) Inventor: Tsutomu Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 32 days.

(21) Appl. No.: 15/716,022

(22) Filed: Sep. 26, 2017

(65) Prior Publication Data

US 2018/0015617 A1    Jan. 18, 2018

Related U.S. Application Data

(63) Continuation of application No. 15/142,611, filed on Apr. 29, 2016, now Pat. No. 9,802,320, which is a (Continued)

(30) Foreign Application Priority Data

May 25, 2011  (JP) ................................. 2011-117111

(51) Int. Cl.
*B25J 9/16*         (2006.01)
*B25J 19/02*        (2006.01)
(Continued)

(52) U.S. Cl.
CPC .......... *B25J 9/1697* (2013.01); *B25J 9/1674* (2013.01); *B25J 11/0085* (2013.01); (Continued)

(58) Field of Classification Search
USPC ......................................................... 382/100
See application file for complete search history.

(56) References Cited

U.S. PATENT DOCUMENTS

| | | |
|---|---|---|
| 5,319,459 A | 6/1994 | Mochizuki |
| 5,453,676 A | 9/1995 | Agrotis |

(Continued)

FOREIGN PATENT DOCUMENTS

| | | | | |
|---|---|---|---|---|
| JP | 362203460 | * | 9/1987 | ............... H04N 1/00 |
| JP | 362203461 | * | 9/1987 | ............... H04N 1/00 |

(Continued)

OTHER PUBLICATIONS

Office Action dated Dec. 26, 2017 in Japanese Patent Application No. 2017-038750, 5 pages.

(Continued)

*Primary Examiner* — Jerome Grant, II
(74) *Attorney, Agent, or Firm* — Xsensus, LLP

(57) ABSTRACT

Provided is an excellent robot device capable of preferably detecting difference between dirt and a scratch on a lens of a camera and difference between dirt and a scratch on a hand. A robot device detects a site in which there is the dirt or the scratch using an image of the hand taken by a camera as a reference image. Further, this determines whether the detected dirt or scratch is due to the lens of the camera or the hand by moving the hand. The robot device performs cleaning work assuming that the dirt is detected, and then this detects the difference between the dirt and the scratch depending on whether the dirt is removed.

11 Claims, 11 Drawing Sheets

HAND IMAGE A

HAND IMAGE B

Related U.S. Application Data continuation of application No. 14/114,333, filed as application No. PCT/JP2012/060248 on Apr. 16, 2012, now Pat. No. 9,358,690.

(51) Int. Cl.

| | | |
|---|---|---|
| *H04N 5/217* | (2011.01) | |
| *G06K 9/00* | (2006.01) | |
| *B25J 11/00* | (2006.01) | |
| *B25J 19/00* | (2006.01) | |
| *G05D 1/00* | (2006.01) | |
| *G05D 1/02* | (2006.01) | |

(52) U.S. Cl.
CPC ......... *B25J 19/0058* (2013.01); *B25J 19/023* (2013.01); *G05D 1/00* (2013.01); *G05D 1/0246* (2013.01); *G05D 1/0272* (2013.01); *G06K 9/00664* (2013.01); *H04N 5/2171* (2013.01); *G05B 2219/39053* (2013.01); *G05D 2201/0217* (2013.01)

(56) References Cited

U.S. PATENT DOCUMENTS

| | | | |
|---|---|---|---|
| 6,087,795 A | 7/2000 | Amagasa | |
| 6,218,741 B1 | 4/2001 | Braun | |
| 6,420,845 B1 | 7/2002 | Mackel | |
| 6,587,573 B1 | 7/2003 | Stam | |
| 7,718,943 B2 | 5/2010 | Johnson | |
| 8,493,505 B2 | 7/2013 | Chen | |
| 9,295,415 B2 * | 3/2016 | Nakamura | A61B 5/1172 |
| 9,538,170 B1 | 1/2017 | Lee | |
| 2001/0042822 A1 | 11/2001 | Hochstein | |
| 2003/0069674 A1 | 4/2003 | Stam | |
| 2005/0192707 A1 | 9/2005 | Park | |
| 2005/0254097 A1 | 11/2005 | Schweid | |
| 2005/0254688 A1 | 11/2005 | Franz | |
| 2006/0048800 A1 | 3/2006 | Rast | |
| 2006/0106518 A1 | 5/2006 | Stam | |
| 2006/0202654 A1 | 9/2006 | Michiyama | |
| 2006/0217844 A1 | 9/2006 | Saeki | |
| 2007/0115357 A1 | 5/2007 | Stein | |
| 2007/0157720 A1 | 7/2007 | Veerasamy | |
| 2007/0157722 A1 | 7/2007 | Veerasamy | |
| 2007/0267993 A1 | 11/2007 | Leleve | |
| 2008/0063258 A1 * | 3/2008 | Kimba | G01N 21/95607 |
| | | | 382/149 |
| 2008/0285797 A1 | 11/2008 | Hammadou | |
| 2008/0292176 A1 * | 11/2008 | Sakai | G06T 7/001 |
| | | | 382/144 |
| 2009/0010494 A1 | 1/2009 | Bechtel | |
| 2010/0012824 A1 | 1/2010 | Backes | |
| 2010/0147067 A1 | 6/2010 | Backes | |
| 2010/0170082 A1 | 7/2010 | Lo | |
| 2010/0199915 A1 | 8/2010 | Pettersson | |
| 2010/0208060 A1 | 8/2010 | Kobayashi | |
| 2010/0245587 A1 * | 9/2010 | Otani | G01C 15/002 |
| | | | 348/169 |
| 2011/0185519 A1 | 8/2011 | Heard | |
| 2011/0221920 A1 | 9/2011 | Gwak | |
| 2011/0253917 A1 | 10/2011 | Rothenhaeusler | |
| 2011/0280026 A1 | 11/2011 | Higgins-Luthman | |
| 2012/0116632 A1 | 5/2012 | Bechtel | |
| 2013/0086765 A1 | 4/2013 | Chen | |
| 2013/0152970 A1 | 6/2013 | Porat | |
| 2014/0009617 A1 | 1/2014 | Utagawa | |
| 2014/0010408 A1 | 1/2014 | Irie | |
| 2015/0022812 A1 * | 1/2015 | Ogawa | G01N 21/956 |
| | | | 356/364 |
| 2015/0302568 A1 * | 10/2015 | Hirai | G01N 23/2254 |
| | | | 382/149 |
| 2018/0005369 A1 * | 1/2018 | Sohn | G06T 7/001 |
| 2018/0122086 A1 * | 5/2018 | Lu | G06T 7/20 |
| 2018/0188189 A1 * | 7/2018 | Hwang | G01N 21/958 |

FOREIGN PATENT DOCUMENTS

| | | | | |
|---|---|---|---|---|
| JP | 403163951 | * | 7/1991 | ............... H04N 1/28 |
| JP | 6-148083 A | | 5/1994 | |
| JP | 9-5249 A | | 1/1997 | |
| JP | 2004-153422 A | | 5/2004 | |
| JP | 2004-289532 A | | 10/2004 | |
| JP | 2005-117262 A | | 4/2005 | |
| JP | 2006-230954 | | 9/2006 | |
| JP | 2007-98567 A | | 4/2007 | |
| JP | 2008-160635 A | | 7/2008 | |
| JP | 2010-172992 A | | 8/2010 | |

OTHER PUBLICATIONS

Office Action dated Nov. 25, 2015, in Chinese Patent Application No. 201280023849 (w/English translation), 20 pages.

Office Action dated Dec. 15, 2015, in Japanese Patent Application No. 2011-117111. (5 pages).

Office Action dated May 12, 2015 in Japanese Patent Application No. 2011-117111.

Office Action dated Dec. 27, 2016 in Japanese Patent Application No. 2016-104196.

* cited by examiner

ROBOT DEVICE 100

HAND IMAGE A

ROBOT DEVICE, METHOD OF CONTROLLING ROBOT DEVICE, COMPUTER PROGRAM, AND PROGRAM STORAGE MEDIUM

CROSS-REFERENCE TO RELATED APPLICATIONS

This application is a continuation application of, and claims the benefit of priority under 35 U.S.C. § 120 from, U.S. application Ser. No. 15/142,611, filed Apr. 29, 2016, herein incorporated by reference, which is a continuation application of U.S. Pat. No. 9,358,690, issued Jun. 7, 2016, which is a National Stage Application of International Application No. PCT/JP12/060248, filed Apr. 16, 2012, herein incorporated by reference, which claims the benefit of priority under 35 U.S.C. § 119 from Japanese Patent Application No. 2011-117111, filed May 25, 2011.

TECHNICAL FIELD

The technology disclosed in this specification relates to a robot device, which works in a human living environment to communicate with a human or perform work such as grasp of an object, for example, a method of controlling the robot device, a computer program, and a program storage medium, and especially relates to the robot device, the method of controlling the robot device, the computer program, and the program storage medium for detecting difference between dirt and a scratch on a lens of a camera and difference between dirt and a scratch on a hand.

BACKGROUND ART

With the rapid advent of aging society, a society in which an aged person may enjoy a healthy active life without requiring nursing care as far as possible and in which the aged person requiring the nursing care may live an independent life without clinical deterioration as far as possible is needed. In the future, as a need for the nursing care and domestic help increases, the number of helpers gets short if one helper looks after one user. Therefore, there is an increasing need for a mechatronics device such as a robot aimed to carry housework and the nursing care for the human by communicating with a human and performing the work such as the grasp of an object mainly in aged care facilities and families with an aged person.

Most of this type of robot devices are provided with a camera, detect or recognize an object in a working space based on an image taken by the camera, and perform the work such as the grasp. Therefore, when there is the dirt or the scratch on the lens of the camera, this significantly affects ability to detect/recognize an object, and this leads to deterioration in operation efficiency. When there is the dirt on a grasping unit of an object such as the hand, a grasped object gets dirty and this gives an adverse mental effect to someone who receives the object.

For example, a robot device, which compares a plurality of images in the same area to detect whether there is dirt on a lens of a camera from difference between images in the same area, is suggested (refer to Patent Document 1, for example). However, the robot device cannot detect whether the difference between the images in the same area is due to the dirt or a scratch on the lens of the camera, in other words, this cannot detect the difference between the dirt and the scratch on the lens of the camera. Also, the robot device cannot detect the dirt on a hand or detect the difference between the dirt and the scratch on the hand.

CITATION LIST

Patent Document

Patent Document 1: Japanese Patent Application Laid-Open No. 2008-160635

SUMMARY OF THE INVENTION

Problems to be Solved by the Invention

An object of the technology disclosed in this specification is to provide an excellent robot device and a method of controlling the robot device capable of preferably detecting difference between dirt and a scratch on a lens of a camera and difference between dirt and a scratch on a hand.

Solutions to Problems

The present application is achieved in view of the above-described problems and the technology recited in claim 1 is
 a robot device, including:
 a camera;
 a hand; and
 a controller, which processes an image taken by the camera and controls operation of the hand, wherein
 the controller
 obtains a reference image obtained by photographing the hand set in a specific position relative to the camera,
 detects whether there is dirt on a lens of the camera or the hand by comparing a first detection image obtained by photographing the hand set in the specific position with the reference image at the time of dirt detection, and
 determines on which of the lens of the camera and the hand the dirt is by comparing a second detection image obtained by photographing the hand moved from the specific position with the first detection image when detecting the dirt on the lens of the camera or the hand.

According to the technology recited in claim 2 of this application, the controller of the robot device according to claim 1 is configured to determine that there is no dirt on the lens of the camera and the hand when correlation between the first detection image and the reference image is high over an entire image and detect the dirt on the lens of the camera or the hand in a low-correlation site when there is the low-correlation site with low correlation on the image.

According to the technology recited in claim 3 of this application, the controller of the robot device according to claim 2 is configured to determine that there is the dirt on the lens of the camera when the correlation is high in the low-correlation site on the image and determines that there is the dirt on the hand when the correlation is low in the low-correlation site on the image when comparing the second detection image with the first detection image.

According to the technology recited in claim 4 of this application, the controller of the robot device according to claim 1 is configured to wipe a dirty portion on the lens of the camera and then compares a third detection image obtained by photographing the hand set in the specific position with the reference image to detect whether there is a scratch on the lens of the camera when determining that there is the dirt on the lens of the camera.

According to the technology recited in claim 5 of this application, the controller of the robot device according to claim 1 is configured to wipe a dirty portion on the hand and then compares a fourth detection image obtained by photographing the hand set in the specific position with the reference image to detect whether there is a scratch on the hand when determining that there is the dirt on the hand.

The technology recited in claim 6 of this application is a method of controlling a robot device, including:

a step of obtaining a reference image by photographing a hand set in a specific position relative to a camera of a robot;

a dirt detecting step of detecting whether there is dirt on a lens of the camera or the hand by comparing a first detection image obtained by photographing the hand set in the specific position with the reference image at the time of dirt detection; and a determining step of determining on which of the lens of the camera and the hand the dirt is by comparing a second detection image obtained by photographing the hand moved from the specific position with the first detection image when detecting the dirt on the lens of the camera or the hand at the dirt detecting step.

The technology recited in claim 7 of this application is a computer program for controlling a robot device, which allows a computer to execute:

a step of obtaining a reference image by photographing a hand set in a specific position relative to a camera of a robot;

a dirt detecting step of detecting whether there is dirt on a lens of the camera or the hand by comparing a first detection image obtained by photographing the hand set in the specific position with the reference image at the time of dirt detection; and a determining step of determining on which of the lens of the camera and the hand the dirt is by comparing a second detection image obtained by photographing the hand moved from the specific position with the first detection image when detecting the dirt on the lens of the camera or the hand at the dirt detecting step.

The computer program according to claim 7 of this application defines the computer program described in a computer-readable format so as to realize a predetermined process on the computer. In other words, a cooperative action is exerted on the computer by installing the computer program according to claim 7 of the present application on the computer, so that a function effect similar to that of the method of controlling the robot device according to claim 6 of the present application is obtained.

The technology recited in claim 8 of this application is a program storage medium storing a control program of a robot device, which allows a computer to execute:

a step of obtaining a reference image by photographing a hand set in a specific position relative to a camera of a robot;

a dirt detecting step of detecting whether there is dirt on a lens of the camera or the hand by comparing a first detection image obtained by photographing the hand set in the specific position with the reference image at the time of dirt detection; and a determining step of determining on which of the lens of the camera and the hand the dirt is by comparing a second detection image obtained by photographing the hand moved from the specific position with the first detection image when detecting the dirt on the lens of the camera or the hand at the dirt detecting step.

Effects of the Invention

According to the technology disclosed in this specification, an excellent robot device, a method of controlling the robot device, a computer program, and a program storage medium capable of preferably detecting difference between dirt and a scratch on a lens of a camera and difference between dirt and a scratch on a hand may be provided.

Still another object, feature, and advantage of the technology disclosed in this specification will be clear by more detailed description based on an embodiment to be described later and the attached drawings.

MODE FOR CARRYING OUT THE INVENTION

Hereinafter, an embodiment of the technology disclosed in this specification is described in detail with reference to the drawings.

Figure 1:
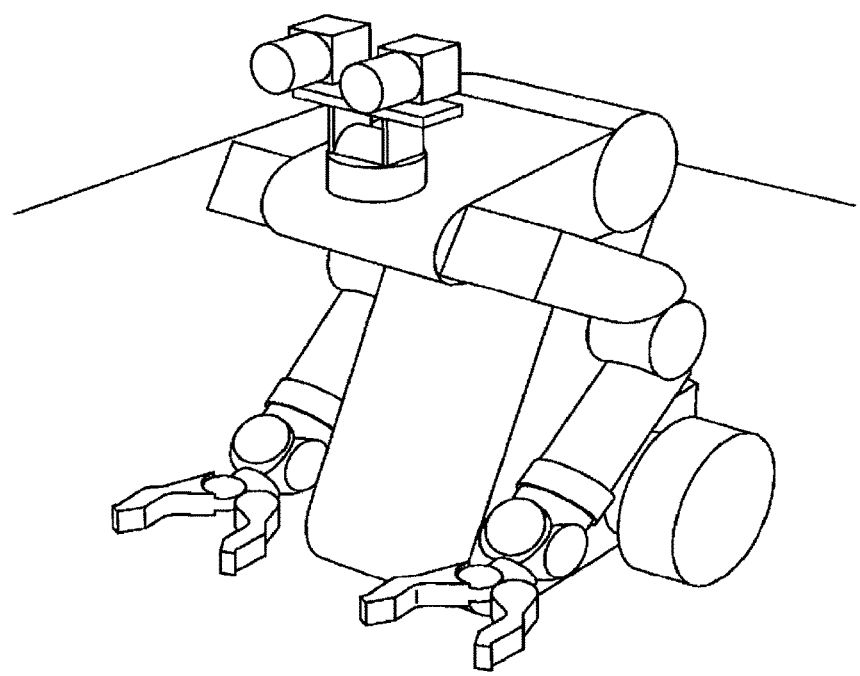
FIG. 1 is a view illustrating an external view of a robot device 100 to which the technology disclosed in this specification may be applied.
Figure 2:
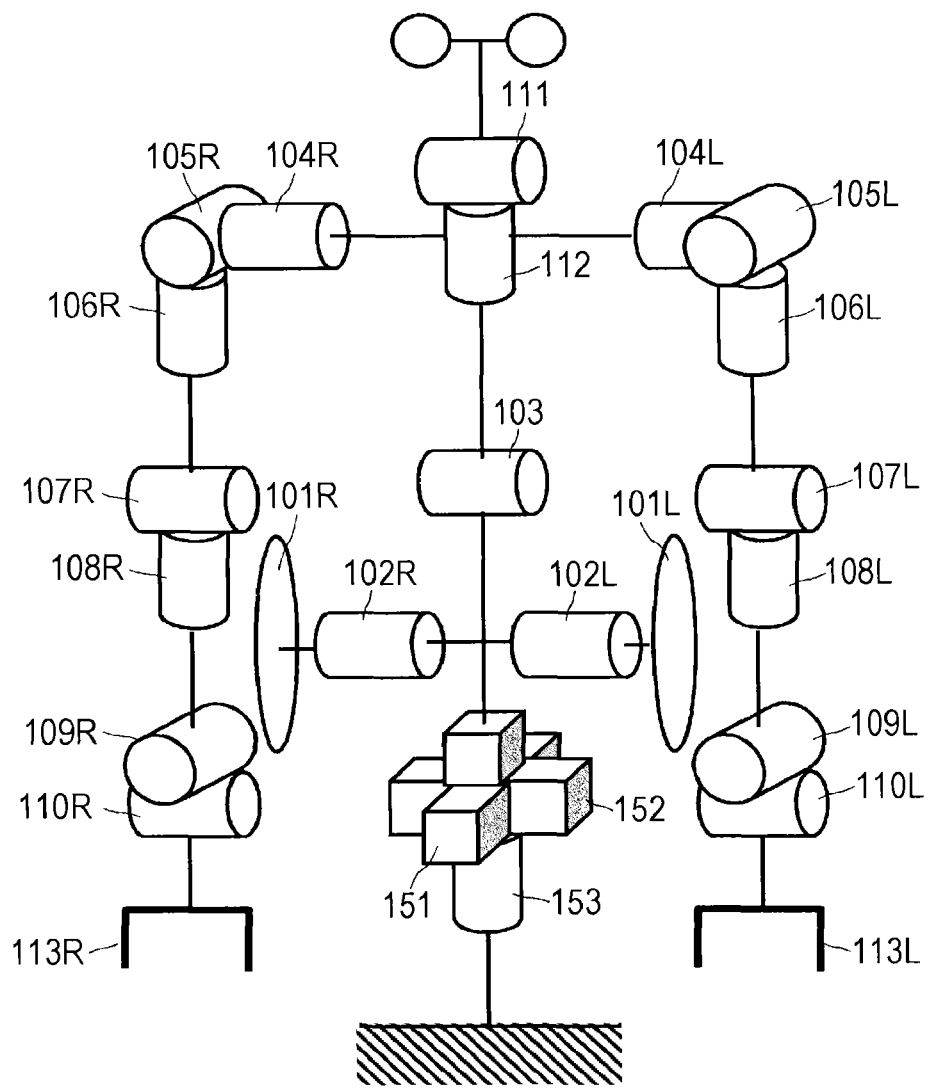
FIG. 2 is a schematic diagram illustrating a degree-of-freedom configuration of a joint of the robot device 100 to which the technology disclosed in this specification may be applied.

FIG. 1 illustrates an external view of a robot device 100 to which the technology disclosed in this specification may be applied. The robot device 100 is a link structural band obtained by connecting a plurality of links with joints in which each joint is operated by an actuator. FIG. 2 schematically illustrates a degree-of-freedom configuration of the joint of the robot device 100. The illustrated robot device 100 is mainly placed at a home environment for providing housework, nursing care and the like; this may also be used for various purposes such as industrial purposes.

The illustrated robot device 100 is provided with two drive wheels 101R and 101L opposed to each other on a base portion as moving means. The drive wheels 101R and 101L are driven by drive wheel actuators 102R and 102L, which rotate about a pitch axis, respectively. Meanwhile, in FIG. 2, reference numerals 151, 152, and 153 represent non-existent underactuated joints corresponding to a translational degree of freedom in an X direction (front-rear direction), a translational degree of freedom in a Y direction (right-left direction), and a rotational degree of freedom about a yaw axis, respectively, of the robot device 100 relative to a floor surface for representing that the robot device 100 moves around a virtual world.

The moving means is connected to an upper body through a hip joint. A waist joint is driven by a waist joint pitch axis actuator 103, which rotates about the pitch axis. The upper body is composed of right and left two arms and a head connected through a neck joint. Each of the right and left arms has a total of seven degrees of freedom including three degrees of freedom at a shoulder joint, two degrees of freedom at an elbow joint, and two degrees of freedom at a wrist joint. The three degrees of freedom at the shoulder joint are driven by a shoulder joint pitch axis actuator 104R/L, a shoulder joint roll axis actuator 105R/L, and a shoulder joint yaw axis actuator 106R/L. The two degrees of freedom at the elbow joint are driven by an elbow joint pitch axis actuator 107R/L and an elbow joint yaw axis actuator 108R/L. The two degrees of freedom at the wrist joint are driven by a wrist joint roll axis actuator 109R/L and a wrist joint pitch axis actuator 110R/L. Two degrees of freedom at the neck joint are driven by a neck joint pitch axis actuator 111 and a neck joint yaw axis actuator 112. One degree of freedom at a hand joint is driven by a hand joint roll axis actuator 113R/L.

Meanwhile, although the illustrated robot device 100 is provided with opposed-two-wheel type moving means, the scope of the technology disclosed in this specification is not limited to the opposed-two-wheel type moving means. For example, the technology disclosed in this specification may also be similarly applied to the robot device 100 provided with leg type moving means.

Figure 3:
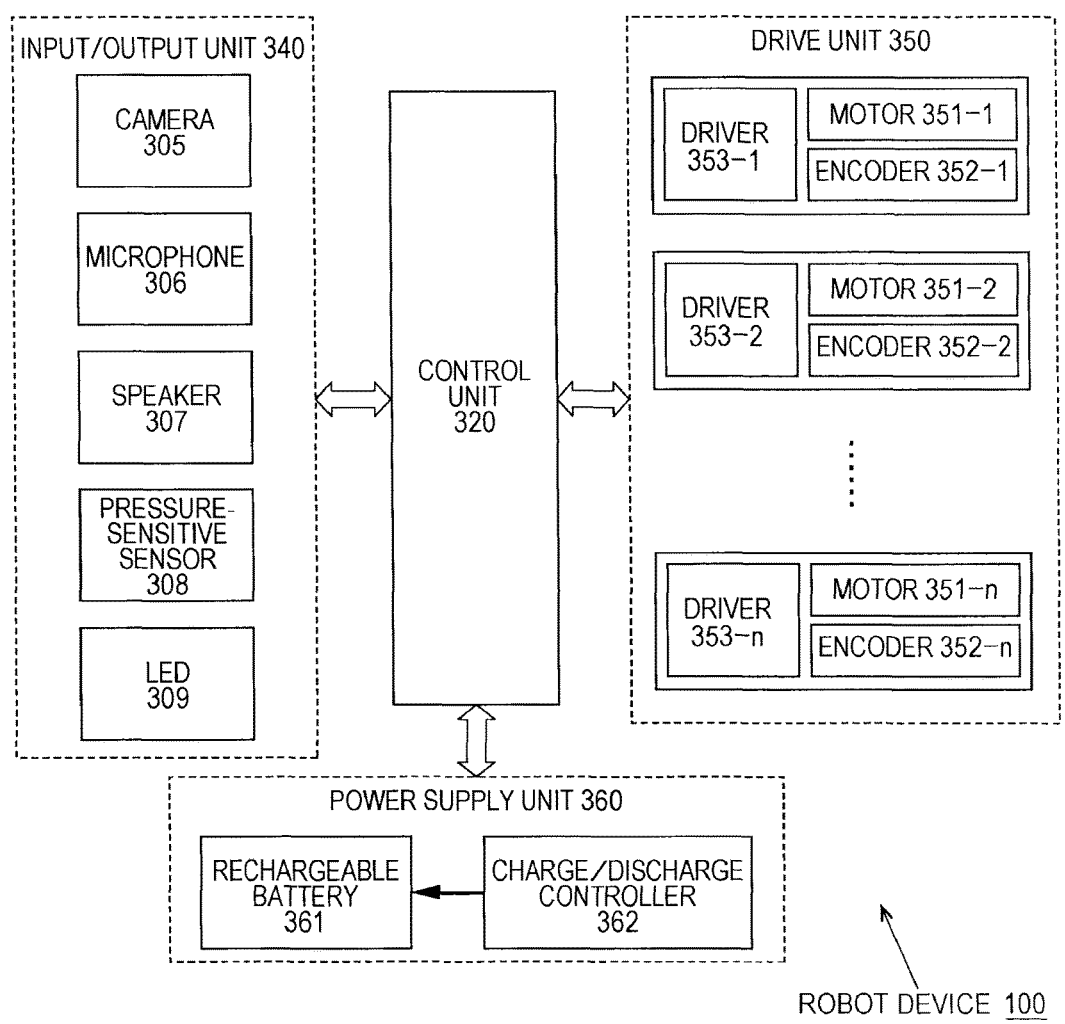
FIG. 3 is a schematic diagram illustrating a functional configuration of the robot device 100 to which the technology disclosed in this specification may be applied.

FIG. 3 schematically illustrates a functional configuration of the robot device 100. The robot device 100 is composed of a control unit 320, which integrally controls entire operation and performs other data processing, an input/output unit 340, a drive unit 350, and a power supply unit 360. Each unit is hereinafter described.

The input/output unit 340 includes a camera 305 corresponding to an eye of the robot device 100, a microphone 306 corresponding to an ear thereof, a pressure-sensitive sensor 308 arranged on a site such as the head and a back for detecting user touch and the like as an input unit. A speaker 307 corresponding to a mouth, an LED indicator (eye lamp) 309, which creates facial expressions by combination of blinks and timing of lighting and the like are included as an output unit. Meanwhile, the camera 305 may also include a camera with fish-eye lens in the substantial center of the head in addition to a stereo camera corresponding to right and left eyes.

The drive unit 350 is a functional module for realizing the degree of freedom at each joint of the robot device 100 and is composed of a plurality of driving units provided for each of a roll axis, the pitch axis, and the yaw axis at each joint. Each driving unit is composed of combination of a motor 351, which performs rotational operation about a predetermined axis, an encoder 352, which detects a rotational position of the motor 351, and a driver 353, which adaptively controls the rotational position and a rotational speed of the motor 351 based on an output of the encoder 352.

The power supply unit 360 is a functional module, which feeds power to each electric circuit and the like in the robot device 100, composed of a rechargeable battery 361 and a charge/discharge controller 362, which manages a charge/discharge state of the rechargeable battery 361.

Figure 4:
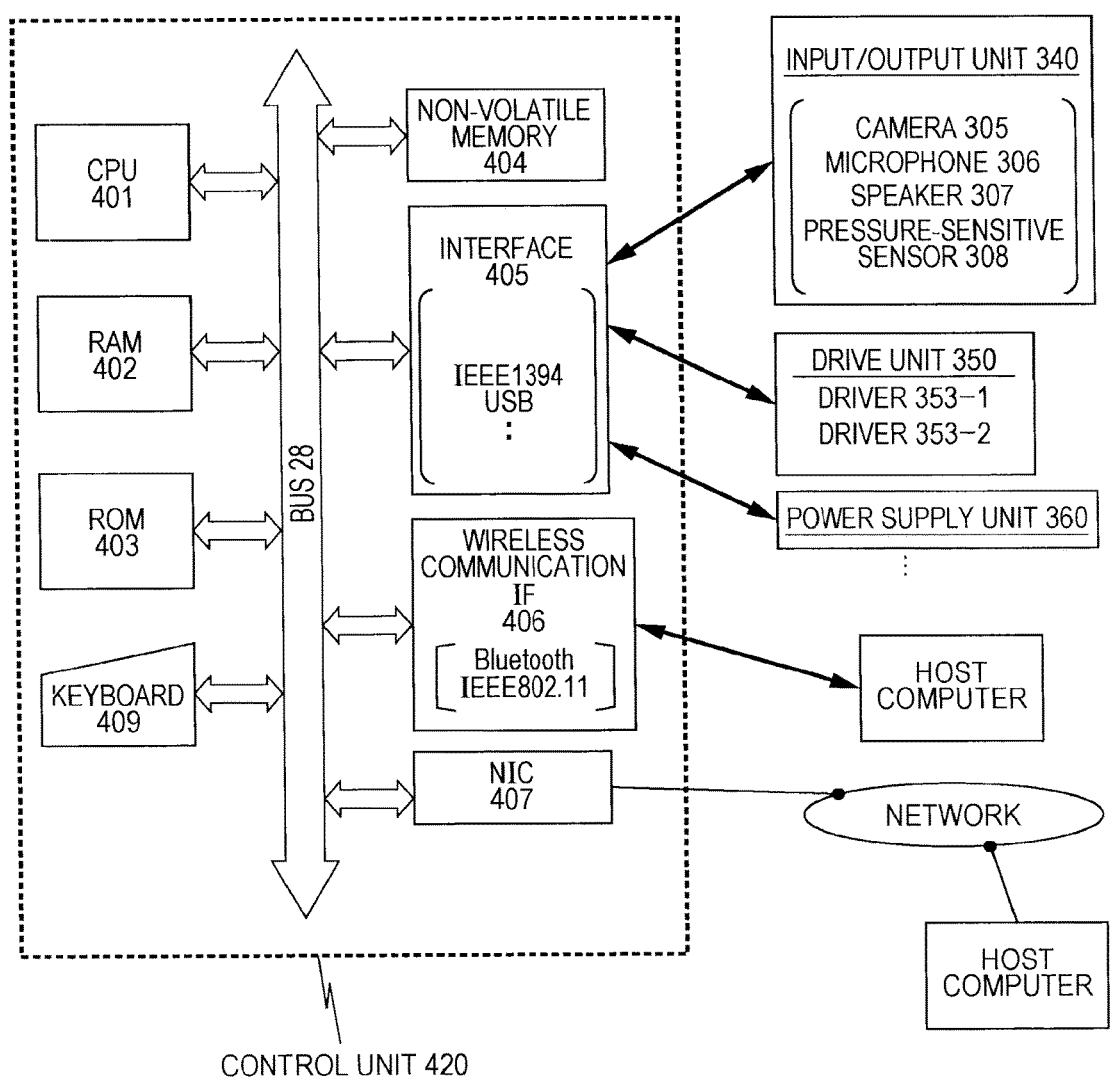
FIG. 4 is a view illustrating a configuration of a control unit 320.

FIG. 4 illustrates a configuration of the control unit 320 in further detail. As illustrated in the drawing, the control unit 320 has a configuration in which a CPU (central processing unit) 401 as a main controller is bus-connected to a memory and other circuit components, and a peripheral device. The CPU 401 may communicate with each device on a bus 408 by specifying an address thereof.

A RAM (random access memory) 402 is used for loading a program code executed by the CPU 401 and temporarily storing working data by an execution program. A ROM (read only memory) 403 permanently stores a self-diagnostic test program executed when the power is on and a control program, which defines operation of the robot device 100. A non-volatile memory 404 is composed of an electrically erasable and rewritable memory device such as an EEPROM (electrically erasable and programmable ROM), for example, and is used for storing data to be sequentially updated such as an encryption key and other security information, and a control program to be installed after shipment in a non-volatile manner.

The control program of the robot device 100 includes a recognition processing program, which processes a sensor input of the camera 305, the microphone 306, the pressure-sensitive sensor 308 and the like to recognize, a control program, which controls operation such as drive of each junction motor 351 and an audio output of the speaker 307, and the like.

An interface 405 is a device interconnected with a device out of the control unit 320 for enabling data exchange. The interface 405 performs data input/output between the same and the camera 305, the microphone 306, and the speaker 307, for example. The interface 405 also performs input/output of the data and a command between the same and each of drivers 353-1 . . . in the drive unit 350. An interface 25 is provided with a general-purpose interface for connecting a peripheral device of a computer such as a parallel interface such as IEEE1394, a USB (universal serial bus) interface, and a memory card interface (card slot) and may move the program and the data between the same and a locally connected external device.

Further, the control unit 320 includes a wireless communication interface 406, a network interface card (NIC) 407 and the like and may perform data communication with various external host computers through proximity wireless data communication such as Bluetooth (™), a wireless network such as IEEE802.11, and a wide area network such as the Internet.

The robot device 100 according to this embodiment is provided with a function to detect dirt and a scratch on a lens of the camera 305 by autonomous operation; a main feature thereof is to detect the dirt and the scratch on the lens of the camera 305 by using an image of a specific site of the robot device 100 such as a hand taken by the camera 305 as a reference image. Herein, when the image of the hand taken by the camera 305 is used as the reference image, the dirt and the scratch detected at the time of detection might be due to both of the lens of the camera 305 and the hand; however, the robot device 100 according to this embodiment may detect whether they are due to the lens of the camera 305 or the hand and may detect difference between the dirt and the scratch as described later.

When there is the dirt on an object grasping unit such as the hand, a grasped object gets dirty and this gives an adverse mental effect to someone who receives the object. On the contrary, the robot device 100 according to this embodiment may detect the dirt on the hand and furthermore remove the dirt by autonomous cleaning operation and the like, so that this does not give the adverse mental effect to a user.

Figure 5:
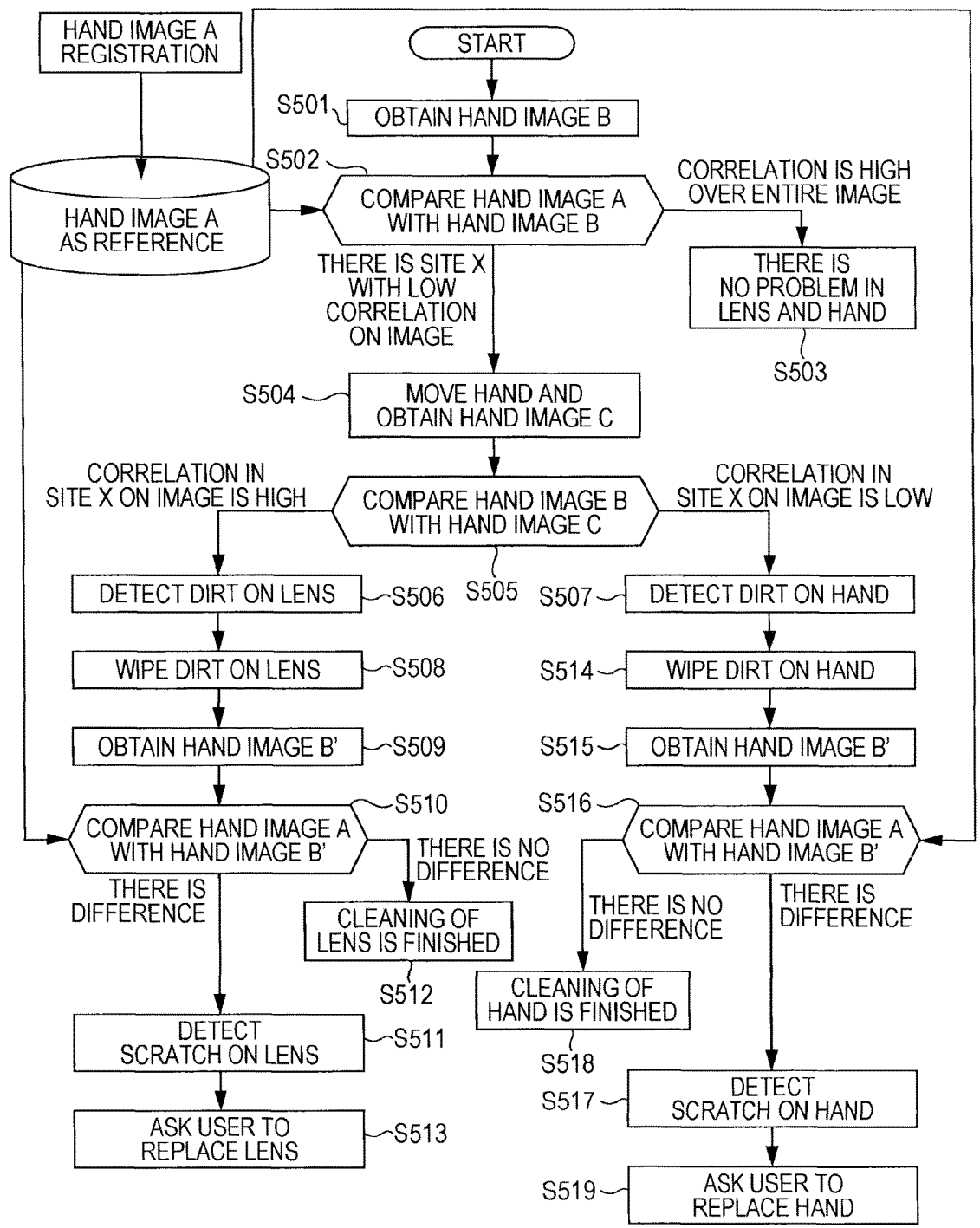
FIG. 5 is a flowchart illustrating a procedure of the robot device 100 to detect difference between dirt and a scratch on a lens of a camera and difference between dirt and a scratch on a hand.

FIG. 5 illustrates a flowchart of a procedure of the robot device 100 to detect the difference between the dirt and the scratch on the lens of the camera and the difference between the dirt and the scratch on the hand.

As a precondition to start the procedure, the reference image is obtained in advance. When the image obtained by photographing the hand is used as the reference image as described above, a hand image obtained by photographing the hand set in a specific position relative to the camera 305 is registered as the reference image. The hand image used as the reference image is hereinafter referred to as a "hand image A".

Figure 6:
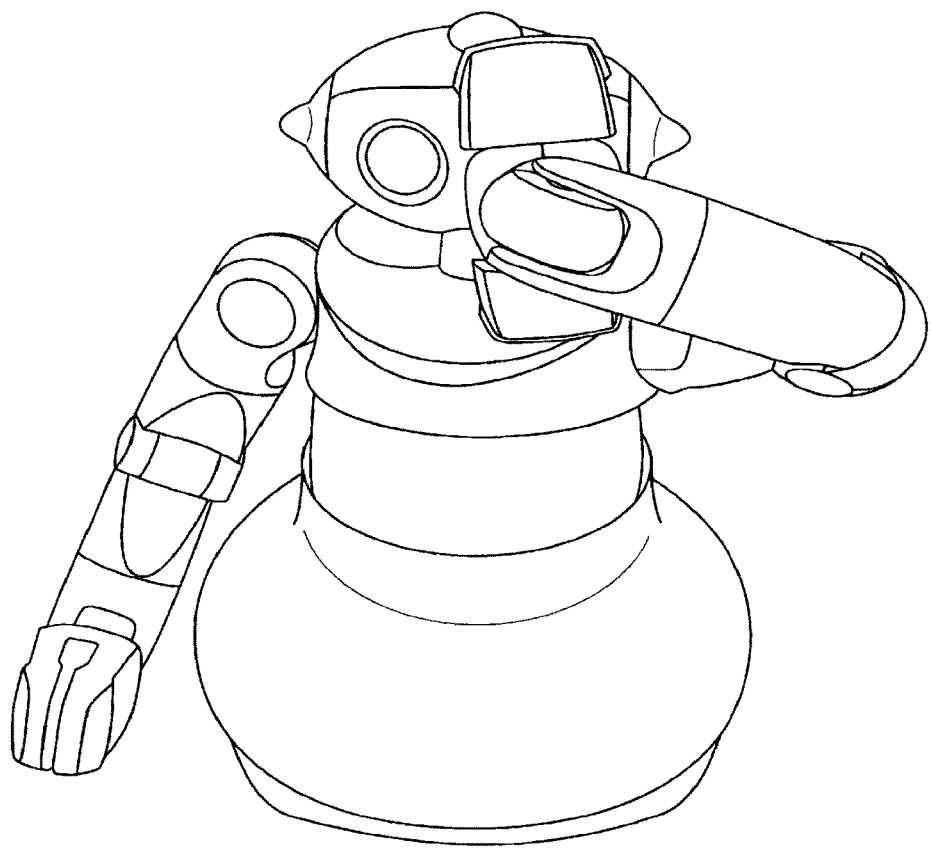
FIG. 6 is a view illustrating a state of moving the hand closer to a stereo camera lens on a head to obtain a hand image A.
Figure 7:
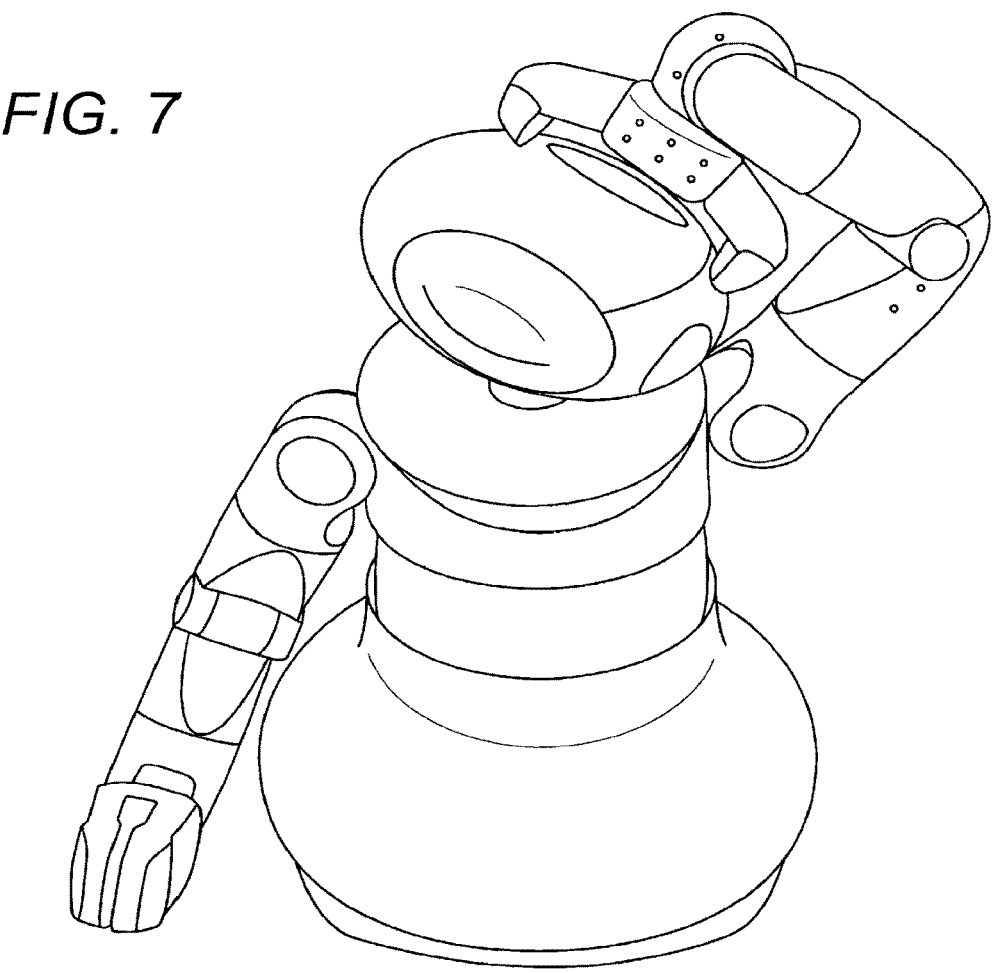
FIG. 7 is a view illustrating a state of moving the hand closer to a fish-eye camera lens on the head to obtain the hand image A.
Figure 8:
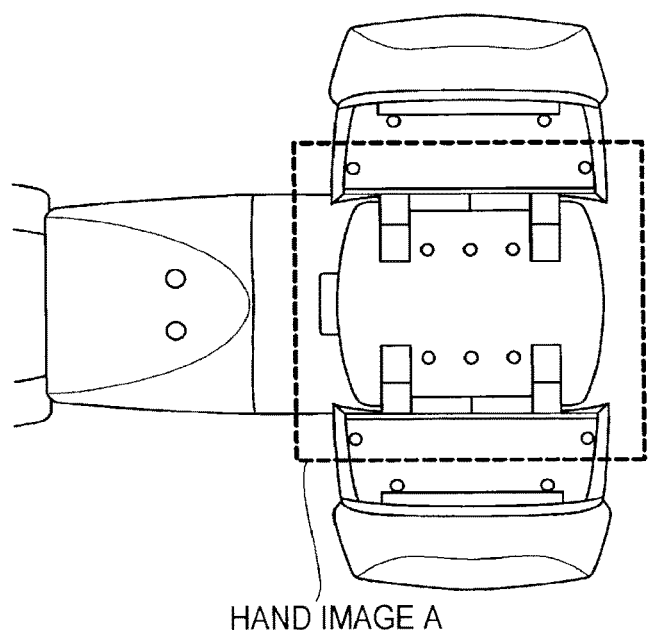
FIG. 8 is a view illustrating an example of the hand image A obtained as a reference image.

When the camera 305 includes the camera with fish-eye lens in the substantial center of the head in addition to the stereo camera corresponding to the right and left eyes, the hand image A is obtained to be registered for both of a stereo camera lens and a fish-eye camera lens. FIG. 6 illustrates a state of moving the hand closer to the stereo camera lens on the head to obtain the hand image A. FIG. 7 illustrates a state of moving the hand closer to the fish-eye camera lens on the head to obtain the hand image A. FIG. 8 illustrates an example of the hand image A obtained as the reference image (an area enclosed by a dotted line in the drawing corresponds to the hand image A).

In a detecting process, a detection image is first obtained (step S501). The detection image is obtained by photographing the hand by each of the stereo camera on the head and the camera with fish-eye lens on the head in the same posture as that taken when the reference image is obtained as illustrated in FIGS. 6 and 7. The hand image obtained as the detection image is hereinafter referred to as a "hand image B".

Next, correlation between the hand image A and the hand image B is calculated (step S502). When there is no dirt and scratch on both of the lens of the camera and a surface of the hand, the correlation between the hand image A and the hand image B must be high over an entire image. Therefore, when the correlation is high over the entire image as a result of calculating the correlation between the images at step S502, it is determined that there is no dirt and scratch on the lens of the camera and the surface of the hand (step S503) and this processing routine is finished.

Figure 9:
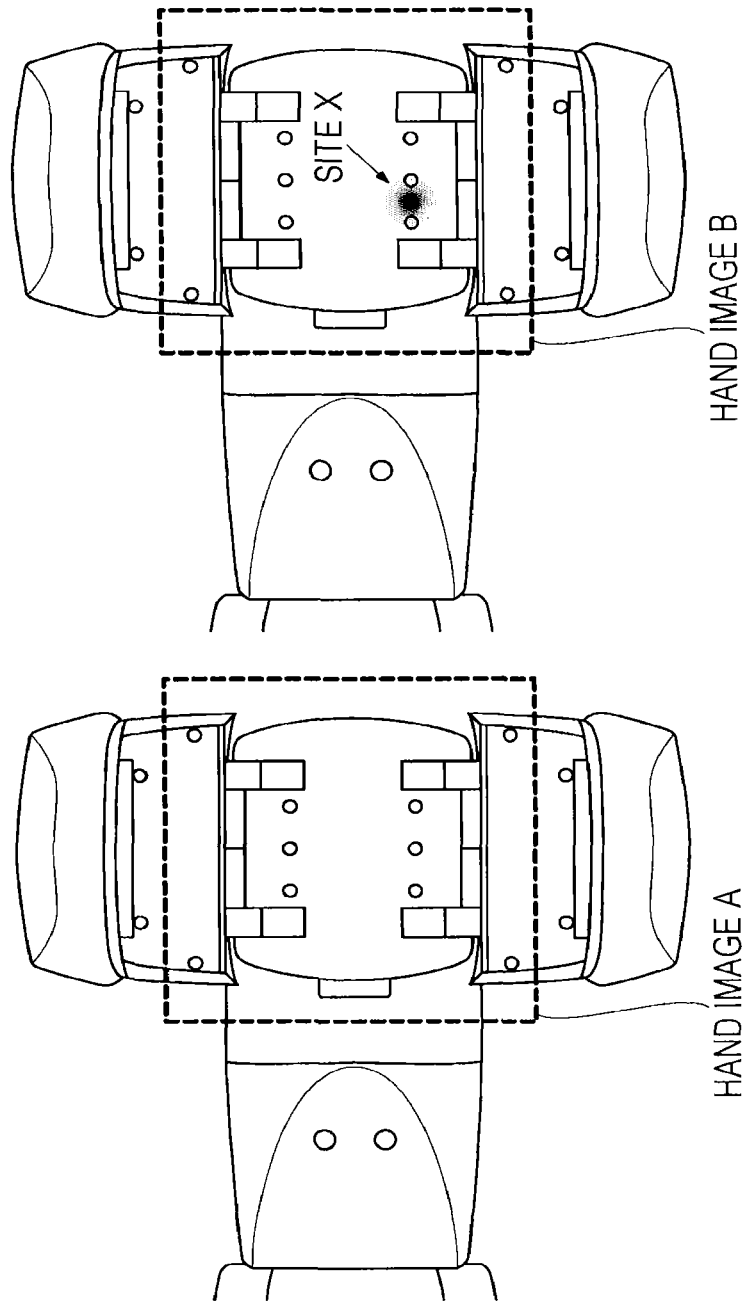
FIG. 9 is a view illustrating the hand image A and a hand image B including a site X next to each other.

On the other hand, when the lens of the camera gets dirty or is scratched and when the surface of the hand gets dirty or is scratched after the hand image A is obtained, the correlation between the images becomes low in a site with the dirt or the scratch. Therefore, when a site with low correlation is detected as a result of calculating the correlation between the images at step S502, it is determined that there is the dirt or the scratch on at least one of the lens of the camera and the surface of the hand, and a subsequent process is executed. The site with the low correlation between the images is hereinafter referred to as a "site X". FIG. 9 illustrates the hand image A and the hand image B including the site X next to each other (areas enclosed by a dotted line in the drawing correspond to the hand image A and the hand image B). It may be understood that the correlation between the images becomes low in the site X with reference to the drawing.

When it is determined that there is the dirt or the scratch on at least one of the lens of the camera and the surface of the hand at step S502, a process for specifying which of the lens of the camera and the surface of the hand causes the low correlation in the site X is subsequently performed.

First, the hand is moved relative to the camera to photograph another position of the hand in the same posture as that taken when the reference image is obtained as illustrated in FIGS. 6 and 7 (step S504). The image obtained at that time is hereinafter referred to as a "hand image C". Then, the correlation between the hand image B and the hand image C is calculated (step S505).

Figure 10:
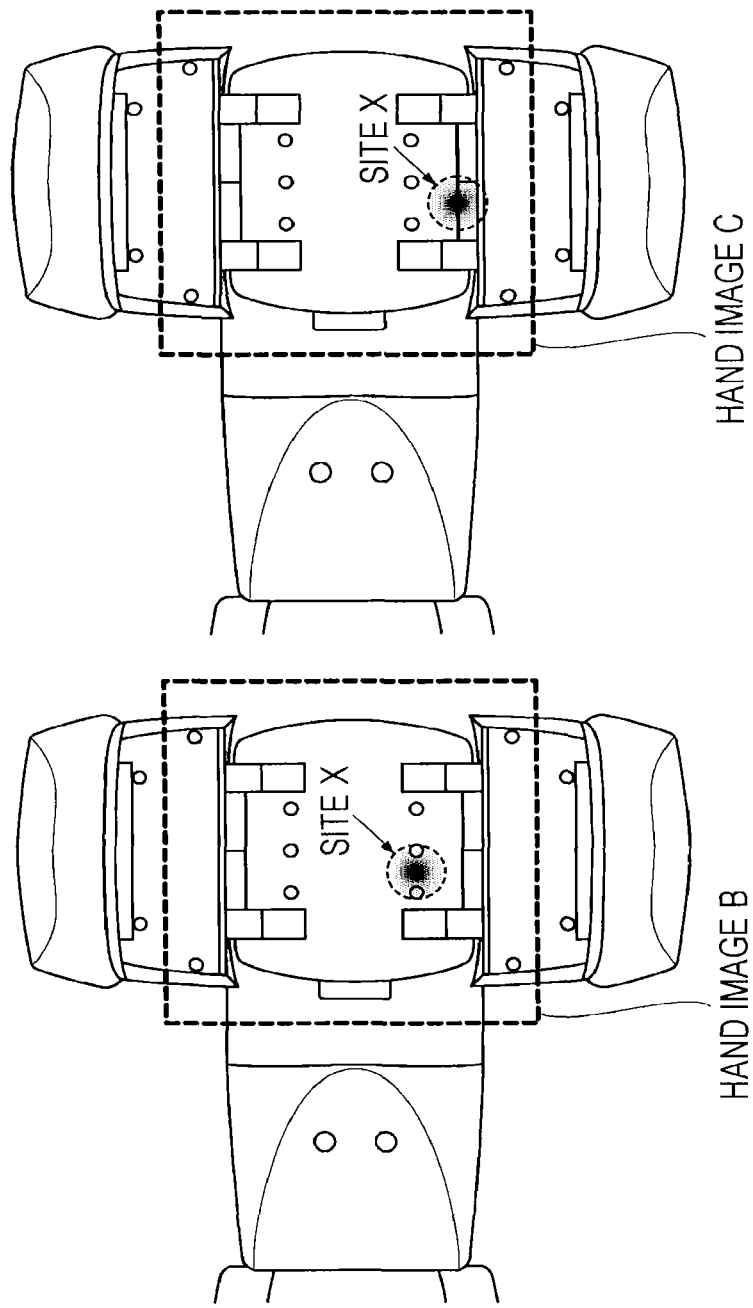
FIG. 10 is a view illustrating a state in which correlation becomes high in the site X on both of the hand image B and a hand image C due to the dirt or the scratch on the lens of the camera.

If the site X in which the correlation is low when the correlation between the hand image A and the hand image B is calculated is due to the dirt or the scratch on the lens of the camera, the correlation in the site X on the image remains high even when the hand is moved. Therefore, when the correlation in the site X on the image remains high as a result of calculating the correlation between the hand image B and the hand image C at step S505, it is determined that there is the dirt or the scratch on the lens of the camera (step S506). FIG. 10 illustrates a state in which the correlation becomes high in the site X on both of the hand image B and the hand image C due to the dirt or the scratch on the lens of the camera (areas enclosed by a dotted line in the drawing correspond to the hand image B and the hand image C).

Figure 11:
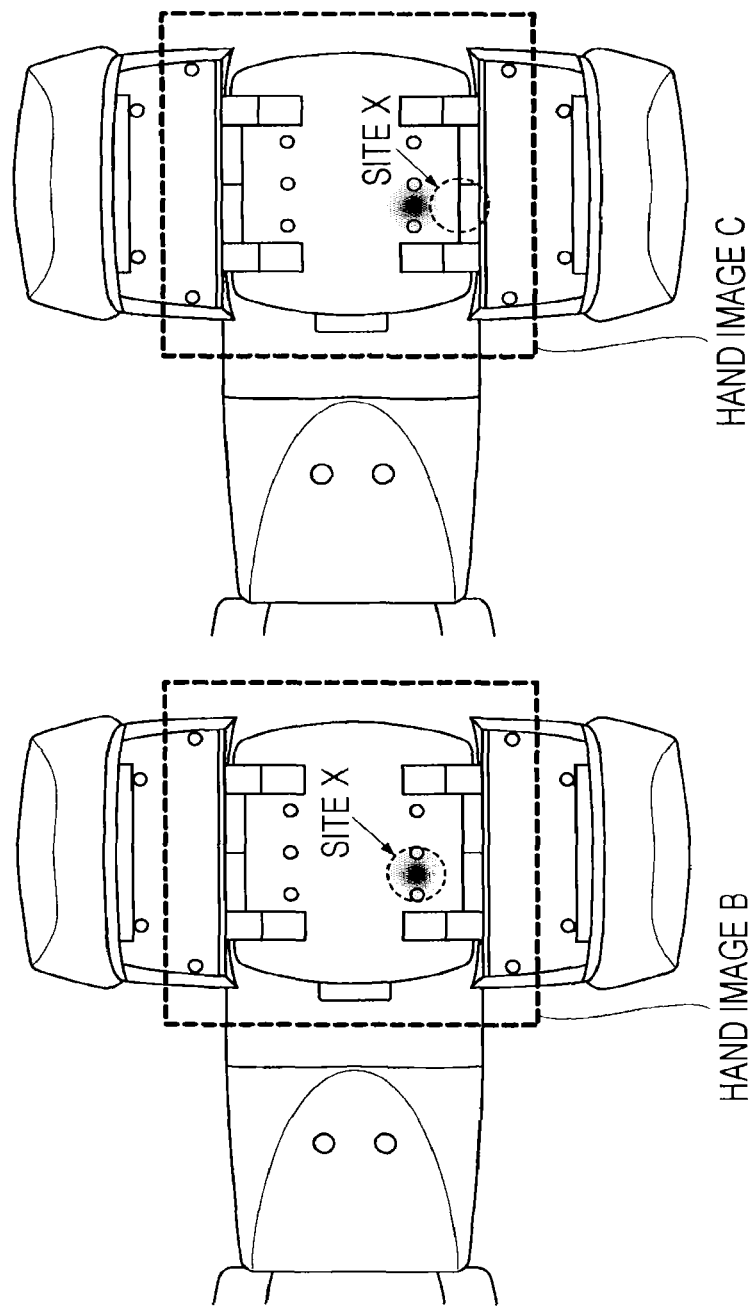
FIG. 11 is a view illustrating a state in which the correlation becomes low in the site X on both of the hand image B and the hand image C because the dirt or the scratch moves along with the movement of the hand due to the dirt or the scratch on the lens of a surface of the hand.

On the other hand, if the site X of the hand image B is due to the dirt or the scratch on the surface of the hand, the site also moves on the hand image after the hand is moved. Therefore, when the correlation in the site X on the image becomes low as a result of calculating the correlation between the hand image B and the hand image C, it is determined that there is the dirt or the scratch on the surface of the hand (step S507). FIG. 11 illustrates a state in which there is the dirt or the scratch on the lens on the surface of the hand, so that the dirt or the scratch moves along with the movement of the hand and the correlation becomes low in the site X on both of the hand image B and the hand image C (areas enclosed by a dotted line in the drawing correspond to the hand image B and the hand image C).

Figure 12:
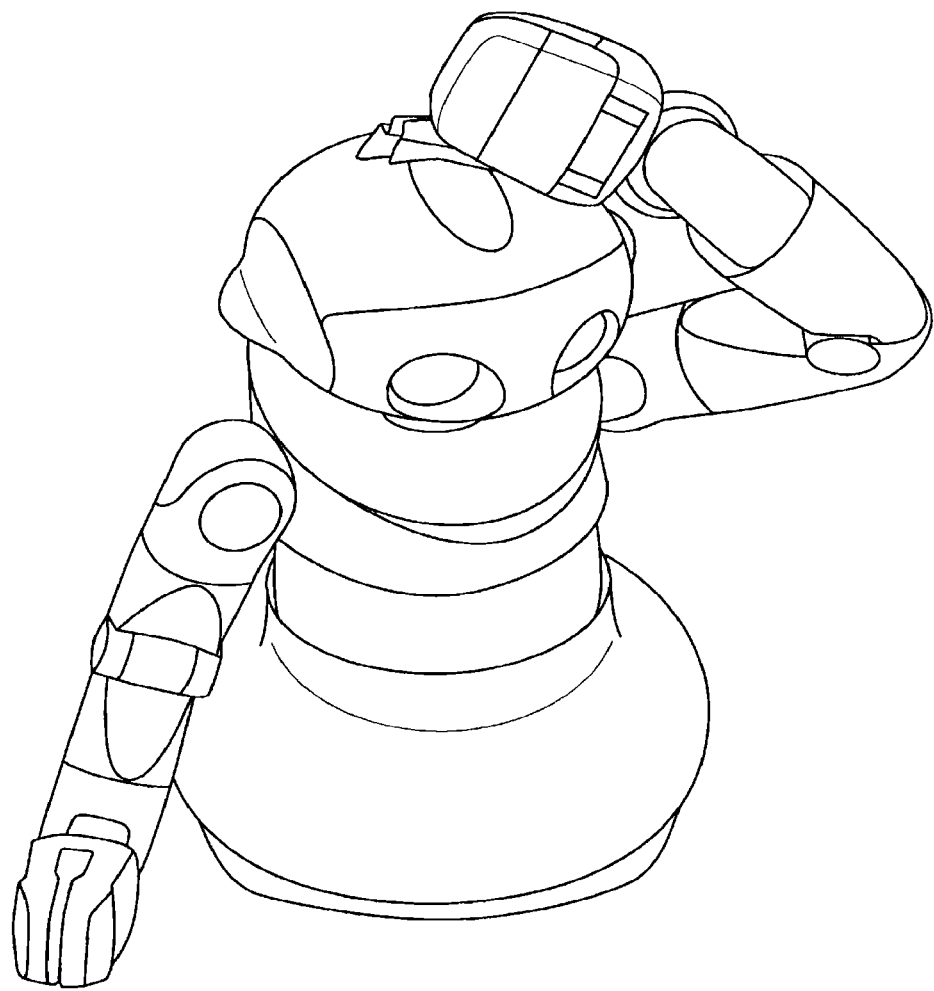
FIG. 12 is a view illustrating a state in which the robot device 100 wipes the dirt on the fish-eye camera lens on the head.

When it is determined that there is the dirt or the scratch on the lens of the camera, this is first assumed to be the dirt and a portion with the dirt on the lens corresponding to the site X is cleaned (step S508). Although cleaning work of the lens may be manually performed by the user, in this embodiment, the robot device 100 performs autonomous work to wipe the dirt with lens cleaner and the like using the hand. FIG. 12 illustrates a state in which the robot device 100 wipes the dirt on the fish-eye camera lens on the head.

After the dirt on the lens is wiped, the hand is photographed again by each of the stereo camera on the head and the camera with fish-eye lens on the head in the same posture as that taken when the reference image is obtained as illustrated in FIGS. 6 and 7 (step S509). The hand image obtained after wiping is hereinafter referred to as a "hand image B'". Then, the correlation between the hand image A and the hand image B' is calculated anew (step S510).

In a case of the dirt on the lens of the camera, the dirt on the lens in the site X is removed by the cleaning, so that the hand image B' approaches the hand image A, which is the reference image. When the correlation is high over an entire image as a result of calculating the correlation between the hand image A and the hand image B', this processing routine is finished supposing that the cleaning of the lens of the camera is finished (step S512).

On the other hand, the scratch on the lens of the camera is not removed by the cleaning, so that the correlation between the hand image B' and the hand image A remains low in the site X. When a site with low correlation is detected as a result of calculating the correlation between the hand image A and the hand image B', it is determined that there is the scratch on the lens of the camera (step S511). When there is the scratch on the lens of the camera, the robot device 100 may finish this processing routine after asking the user to replace the lens (step S513).

When it is determined that there is the dirt or the scratch on the surface of the hand, this is first assumed to be the dirt and a portion with the dirt on the surface of the hand corresponding to the site X is cleaned (step S514). Although cleaning work of the hand may be manually performed by the user, in this embodiment, the robot device 100 performs autonomous work.

After the dirt on the surface of the hand is wiped, the hand is photographed again by each of the stereo camera on the head and the camera with fish-eye lens on the head in the same posture as that taken when the reference image is obtained as illustrated in FIGS. 6 and 7 (step S515) to obtain the hand image B'. Then, the correlation between the hand image A and the hand image B' is calculated anew (step S516).

In a case of the dirt on the lens on the surface of the hand, the dirt on the surface of the hand in the site X is removed by the cleaning, so that the hand image B' approaches the hand image A, which is the reference image. When the correlation is high over the entire image as a result of calculating the correlation between the hand image A and the hand image B', this processing routine is finished supposing that the cleaning of the lens on the surface of the hand is finished (step S518).

On the other hand, the scratch on the surface of the hand is not removed by the cleaning, so that the correlation between the hand image B' and the hand image A remains low in the site X. When the site with the low correlation is detected as a result of calculating the correlation between the hand image A and the hand image B', it is determined that there is the scratch on the surface of the hand (step S517). When there is the scratch on the surface of the hand, the robot device 100 may finish this processing routine after asking the user to replace the hand (step S519).

Meanwhile, although not illustrated in FIG. 5, the robot device 100 may photograph the hand in the posture as illustrated in FIGS. 6 and 7 to update the reference image after the cleaning of the lens of the camera is finished at step S511 or after the cleaning of the surface of the hand is finished at step S516.

As described above, the robot device 100 according to this embodiment may automatically detect the dirt on the lens of the camera and clean the same. Also, this may reduce erroneous detection of the image by automatically detecting the dirt on the lens of the camera and cleaning the same. Further, the robot device 100 may automatically detect the scratch on the lens of the camera and ask the user to replace the lens.

The robot device 100 according to this embodiment may automatically detect the dirt on the surface of the hand and clean the hand. Also, this may keep the object grasped by the hand clean by automatically detecting the dirt on the surface of the hand and cleaning the same. Further, the robot device 100 may automatically detect the scratch on the surface of the hand and ask the user to replace the hand.

Meanwhile, the technology disclosed in this specification may also have a following configuration.

(1) A robot device, including: a camera; a hand; and a controller, which processes an image taken by the camera and controls operation of the hand, wherein
the controller
obtains a reference image obtained by photographing the hand set in a specific position relative to the camera,
detects whether there is dirt on a lens of the camera or the hand by comparing a first detection image obtained by photographing the hand set in the specific position with the reference image at the time of dirt detection, and
determines on which of the lens of the camera and the hand the dirt is by comparing a second detection image obtained by photographing the hand moved from the specific position with the first detection image when detecting the dirt on the lens of the camera or the hand.

(2) The robot device according to (1), wherein the controller determines that there is no dirt on the lens of the camera and the hand when correlation between the first detection image and the reference image is high over an entire image and detects the dirt on the lens of the camera or the hand in a low-correlation site when there is the low-correlation site with low correlation on the image.

(3) The robot device according to (2), wherein the controller determines that there is the dirt on the lens of the camera when the correlation is high in the low-correlation site on the image and determines that there is the dirt on the hand when the correlation is low in the low-correlation site on the image when comparing the second detection image with the first detection image.

(4) The robot device according to (1), wherein the controller wipes a dirty portion on the lens of the camera and then compares a third detection image obtained by photographing the hand set in the specific position with the reference image to detect whether there is a scratch on the lens of the camera when determining that there is the dirt on the lens of the camera.

(5) The robot device according to (1), wherein the controller wipes a dirty portion on the hand and then compares a fourth detection image obtained by photographing the hand set in the specific position with the reference image to detect whether there is a scratch on the hand when determining that there is the dirt on the hand.

(6) A method of controlling a robot device, including: a step of obtaining a reference image by photographing a hand set in a specific position relative to a camera of a robot;
a dirt detecting step of detecting whether there is dirt on a lens of the camera or the hand by comparing a first detection image obtained by photographing the hand set in the specific position with the reference image at the time of dirt detection; and
a determining step of determining on which of the lens of the camera and the hand the dirt is by comparing a second detection image obtained by photographing the hand moved from the specific position with the first detection image when detecting the dirt on the lens of the camera or the hand at the dirt detecting step.

(7) A computer program for controlling a robot device, which allows a computer to execute: a step of obtaining a reference image by photographing a hand set in a specific position relative to a camera of a robot; a dirt detecting step of detecting whether there is dirt on a lens of the camera or the hand by comparing a first detection image obtained by photographing the hand set in the specific position with the reference image at the time of dirt detection; and a determining step of determining on which of the lens of the camera and the hand the dirt is by comparing a second detection image obtained by photographing the hand moved from the specific position with the first detection image when detecting the dirt on the lens of the camera or the hand at the dirt detecting step.

(8) A program storage medium storing a control program of a robot device, which allows a computer to execute: a step of obtaining a reference image by photographing a hand set in a specific position relative to a camera of a robot; a dirt detecting step of detecting whether there is dirt on a lens of the camera or the hand by comparing a first detection image obtained by photographing the hand set in the specific position with the reference image at the time of dirt detection; and a determining step of determining on which of the lens of the camera and the hand the dirt is by comparing a second detection image obtained by photographing the hand moved from the specific position with the first detection image when detecting the dirt on the lens of the camera or the hand at the dirt detecting step.

INDUSTRIAL APPLICABILITY

The technology disclosed in this specification is described above in detail with reference to a specific embodiment. However, it is obvious that one skilled in the art may modify or replace the embodiment without departing from the scope of the technology disclosed in this specification.

Although the embodiment applied to an opposed-two-wheel type robot device is mainly described in this specification, the scope of the technology disclosed in this specification is not limited to this. This technology may also be similarly applied to the robot device provided with the camera and the hand even if this is provided with another moving means or this is not provided with the moving means.

Although the image obtained by photographing the hand of the robot device is used as the reference image in this specification, an image obtained by photographing a site of the robot device other than the hand may also be used as the reference image.

Although the embodiment regarding a household robot is mainly described in this specification, it goes without saying that this technology may also be similarly applied to the robot device for various purposes including an industrial robot.

In short, this technology is disclosed as an example, so that the contents of this specification should not be interpreted in a limited manner. In order to determine the scope of this technology, claims should be taken into consideration.

REFERENCE SIGNS LIST

100 robot device, 101 drive wheel, 102 drive wheel actuator, 103 waist joint pitch axis actuator, 104 shoulder joint pitch axis actuator, 105 shoulder joint roll axis actuator, 106 shoulder joint yaw axis actuator, 107 elbow joint pitch axis actuator, 108 elbow joint yaw axis actuator, 109 wrist joint roll axis actuator, 110 neck joint pitch axis actuator, 111 neck joint pitch axis actuator, 113 hand joint roll axis actuator, 151, 152, 153 underactuated joint, 305 camera, 306 microphone, 307 speaker, 308 pressure-sensitive sensor, 309 LED indicator, 320 control unit, 340 input/output unit, 350 drive unit, 351 motor, 352 encoder, 353 driver, 360 power supply unit, 361 rechargeable battery, 362 charge/discharge controller, 401 CPU, 402 RAM, 403 ROM, 404 non-volatile memory, 405 interface, 406 wireless communication interface, 407 network interface card, 408 bus

The invention claimed is:

1. An information processing device, comprising:
circuitry configured to
  detect whether there is a foreign object on either an image capturing device or a subject by comparing a reference image with a first image,
  determine which of the image capturing device and the subject has the foreign object thereon by comparing the first image with a second image on a condition that the foreign object is detected on the image capturing device or on the subject, and
  control performance of clean work on the image capturing device or the subject after the determining which of the image capturing device and the subject has the foreign object thereon, wherein
the reference image is an image of a specific site of a subject captured by the image capturing device,
the first image is the image of the specific site of the subject, in a same posture as that taken when the reference image is obtained, captured by the image capturing device, and
the second image is the image of the specific site of the subject, in a different posture as that taken when the first image is obtained, captured by the image capturing device.

2. The device according to claim 1, wherein the circuitry is configured to
determine which of the image capturing device and the subject has the foreign object thereon by comparing the reference image with a third image after the performance of clean work,
wherein the third image is the image of the specific site of the subject, in a same posture as that taken when the reference image is obtained, captured by the image capturing device after the performance of clean work.

3. The device according to claim 1, wherein the circuitry is configured to
detect that there is no foreign object on the image capturing device and the subject when a correlation between the first image and the reference image is higher than a predetermined value for an entirety of the first image and the reference image, and
detect that there is the foreign object on either the image capturing device or the subject when it is determined that a site exists in which the correlation is lower than the predetermined value.

4. An information processing device, comprising:
circuitry configured to
  detect whether there is a foreign object on either an image capturing device or a subject by comparing a reference image with a first image, and
  determine which of the image capturing device and the subject has the foreign object thereon by comparing the first image with a second image on a condition that the foreign object is detected on the image capturing device or on the subject, wherein
the reference image is an image of a specific site of a subject captured by the image capturing device,
the first image is the image of the specific site of the subject, in a same posture as that taken when the reference image is obtained, captured by the image capturing device,
the second image is the image of the specific site of the subject, in a different posture as that taken when the first image is obtained, captured by the image capturing device, the circuitry is further configured to
  detect that there is no foreign object on the image capturing device and the subject when a correlation between the first image and the reference image is higher than a predetermined value for an entirety of the first image and the reference image, and
  detect that there is the foreign object on either the image capturing device or the subject when it is determined that a site exists in which the correlation is lower than the predetermined value, and
the circuitry is further configured to, when the circuitry detects that there is the foreign object on either of the image capturing device or the subject,
  determine that there is the foreign object on the image capturing device when the correlation between the first image and the second image in the site, in which the correlation between the first image and the reference image is lower, is higher than the predetermined value, and
  determine that there is the foreign object on the subject when the correlation between the first image and the second image in the site, in which the correlation between the first image and the reference image is lower, is lower than the predetermined value.

5. The device according to claim 1, wherein the circuitry is configured to
capture the specific site of the device as the subject.

6. An information processing method, comprising:
  detecting whether there is a foreign object on either an image capturing device or a subject by comparing a reference image with a first image;
  determining, using circuitry, which of the image capturing device and the subject has the foreign object thereon by comparing the first image with a second image on a condition that the foreign object is detected on the image capturing device or on the subject; and
  controlling performance of clean work on the image capturing device or the subject after the determining which of the image capturing device and the subject has the foreign object thereon, wherein
  the reference image is an image of a specific site of a subject captured by the image capturing device,
  the first image is the image of the specific site of the subject, in a same posture as that taken when the reference image is obtained, captured by the image capturing device, and
  the second image is the image of the specific site of the subject, in a different posture as that taken when the first image is obtained, captured by the image capturing device.

7. The information processing method according to claim 6, further comprising:
  determining which of the image capturing device and the subject has the foreign object thereon by comparing the reference image with a third image after the performance of clean work,
  wherein the third image is the image of the specific site of the subject, in a same posture as that taken when the reference image is obtained, captured by the image capturing device after the performance of clean work.

8. The information processing method according to claim 6, wherein the detecting further comprises:
  detecting that there is no foreign object on the image capturing device and the subject when a correlation between the first image and the reference image is higher than a predetermined value for an entirety of the first image and the reference image; and
  detecting that there is the foreign object on either the image capturing device or the subject when it is determined that a site exists in which the correlation is lower than the predetermined value.

9. The information processing method according to claim 6, further comprising:
  capturing the specific site of the device as the subject.

10. An information processing method, comprising:
  detecting whether there is a foreign object on either an image capturing device or a subject by comparing a reference image with a first image; and
  determining, using circuitry, which of the image capturing device and the subject has the foreign object thereon by comparing the first image with a second image on a condition that the foreign object is detected on the image capturing device or on the subject, wherein
  the reference image is an image of a specific site of a subject captured by the image capturing device,
  the first image is the image of the specific site of the subject, in a same posture as that taken when the reference image is obtained, captured by the image capturing device, and
  the second image is the image of the specific site of the subject, in a different posture as that taken when the first image is obtained, captured by the image capturing device, wherein
  the detecting further comprises:
    detecting that there is no foreign object on the image capturing device and the subject when a correlation between the first image and the reference image is higher than a predetermined value for an entirety of the first image and the reference image; and
    detecting that there is the foreign object on either the image capturing device or the subject when it is determined that a site exists in which the correlation is lower than the predetermined value, and
  when the detecting detects that there is the foreign object on either of the image capturing device or the subject, the determining further comprises:
    determining that there is the foreign object on the image capturing device when the correlation between the first image and the second image in the site, in which the correlation between the first image and the reference image is lower, is higher than the predetermined value; and
    determining that there is the foreign object on the subject when the correlation between the first image and the second image in the site, in which the correlation between the first image and the reference image is lower, is lower than the predetermined value.

11. A non-transitory computer readable medium having stored thereon a program that when executed by processing circuitry causes the processing circuitry to implement an information processing method, comprising:
  detecting whether there is a foreign object on either an image capturing device or a subject by comparing a reference image with a first image;
  determining which of the image capturing device and the subject has the foreign object thereon by comparing the first image with a second image on a condition that the foreign object is detected on the image capturing device or on the subject; and
  controlling performance of clean work on the image capturing device or the subject after the determining which of the image capturing device and the subject has the foreign object thereon, wherein the reference image is an image of a specific site of a subject captured by the image capturing device, the first image is the image of the specific site of the subject, in a same posture as that taken when the reference image is obtained, captured by the image capturing device, and the second image is the image of the specific site of the subject, in a different posture as that taken when the first image is obtained, captured by the image capturing device.

* * * * *